April 3, 1962
C. J. BOGNAR
3,028,469
HIGH FREQUENCY WELDER ASSEMBLY
Filed Oct. 20, 1960
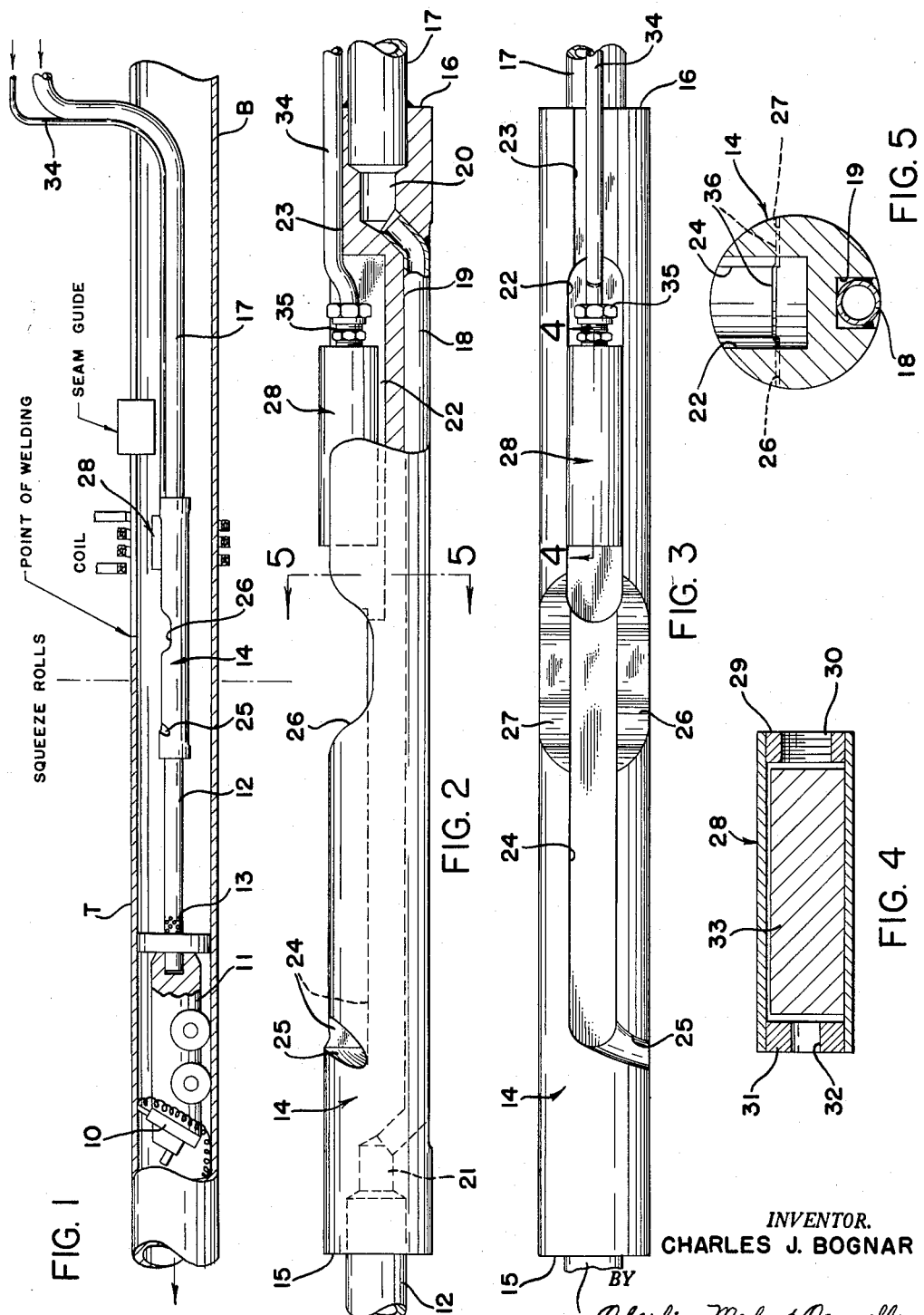
INVENTOR.
CHARLES J. BOGNAR
BY
Oberlin, Maky & Donnelly
ATTORNEYS

United States Patent Office 3,028,469
Patented Apr. 3, 1962

3,028,469
HIGH FREQUENCY WELDER ASSEMBLY
Charles J. Bognar, Parma, Ohio, assignor to The Yoder Company, Cleveland, Ohio, a corporation of Ohio
Filed Oct. 20, 1960, Ser. No. 63,855
10 Claims. (Cl. 219—8.5)

This invention relates to high frequency welding apparatus and, more particularly, to an assembly such as used for continuous tube welding wherein a magnetic core is disposed within the longitudinally advancing tube blank to assist heating of the edges by concentrated high frequency current flow in the same.

It is a primary object of the invention to provide an improved mounting for such a core element within a tube blank and the like, including means for removing the heat which is developed in the element by exposure of the same to coolant flow.

It is another object to provide such an assembly which is protected against accumulation of weld splatter thereon, whereby the assembly can be positioned very close to the weld zone without the danger that molten splatter will build up thereon and hinder the welding operation. The thus permitted proximity of the core material to the weld zone is advantageous, since testing has demonstrated such an arrangement to be most effective and also that less core material is required to obtain a satisfactory weld.

A further object of the invention is to provide an internal core mounting in which coolant employed to extract heat from the core is also utilized to cool and flush molten weld splatter.

It is another object to provide such tube welding apparatus including an inner scarfing tool and coolant tube extending thereto wherein a magnetic core device is supported by said coolant tube and this device is provided with a separate system for supply of coolant to the same independent of the coolant flow to the scarfing tool.

An additional object is the provision of support means for a core element in such use which is suited for mounting core elements of varying length.

Other objects and advantages of the present invention will become apparent as the following description proceeds.

To the accomplishment of the foregoing and related ends, the invention, then, comprises the features hereinafter fully described and particularly pointed out in the claims, the following description and the annexed drawing setting forth in detail certain illustrative embodiments of the invention, these being indicative, however, of but a few of the various ways in which the principle of the invention may be employed.

In said drawing:

FIG. 1 is a diagrammatic representation of apparatus for high frequency tube welding incorporating a magnetic core assembly in accordance with the present invention;

FIG. 2 is a side elevational view of such core assembly on an enlarged scale and partially in section;

FIG. 3 is a top plan view of the core assembly;

FIG. 4 is a longitudinal sectional view, indicated by the line 4—4 in FIG. 3, of a component of the assembly, with the scale further enlarged; and FIG. 5 is a transverse sectional view, similarly on a further enlarged scale, of the assembly at the plane indicated by the line 5—5 in FIG. 2.

Referring now to the drawings in detail, the diagrammatic representation of FIG. 1 will readily be recognized as high frequency induction tube welding apparatus of the type shown, for example, in U.S. Patent No. 2,687,-464, dated August 24, 1954, to which reference may be course be had for further structural and functional detail if desired.

For present purposes, it is sufficient to know that the tube blank B is longitudinally advanced in the direction indicated by the arrow and that its edges are progressively brought together as the blank, initially a flat strip, is formed to cylindrical or tubular shape by conventional tube mill construction. The advancing edges come together at the point designated "Point of Welding" in the drawing, after proceeding by a seam guide and then through an induction coil, with such devices so labeled in the drawings. As is well understood, the coil is connected to a source of energy at high frequency and induces current flow circumferentially in the portion of the blank embraced thereby and along the opposed spaced edges to and around the advanced point of juncture of the same, the latter being the point of welding and the product therebeyond being welded tubing designated by the reference character T. The point of juncture and welding is finally determined by squeeze rolls the centerline of which is also indicated in FIG. 1.

In addition to the foregoing, representing one type of known apparatus for high frequency tube welding, it is also known to provide an internal bead trimming or scarfing tool as shown at 10 mounted on a suitable carriage or mandrel 11 within the welded tubing T. A pipe or tube length 12 extends rearwardly from this carriage for conduction of liquid coolant to the region of the scarfing tool, with the tube end adjacent the carriage provided with perforations 13 for discharge of such liquid.

According to the present improvements, a cradle 14 made of non-magnetic material, such as brass, is connected at one end 15 to the coolant tube length 12 and at its other end 16 to a further tube length 17 which proceeds along the interior of the tube blank to a point where it bends upwardly to emerge freely therefrom for connection to an external source of the coolant. This cradle is fairly long and will be seen, in effect, to be inserted physically in the conduit for conveying the coolant to the inner scarfing tool, whereby it extends in the direction of the advance of the blank.

Communication between the coolant tube lengths 12 and 17 separated physically by the cradle is provided by a conduit 18 housed in a longitudinal slot 19 formed therefor along the bottom of the cradle, with the ends of such through connecting conduit respectively leading to the end recesses 20 and 21 of the cradle which receive the connected ends of the tube or pipe lengths 12 and 17. The latter thus physically support the cradle, while the coolant flow to the scarfing tool is unimpeded.

The top portion of the cradle, which is cylindrical, is formed with a first longitudinally extending slot 22 which is fairly wide and deep. A communicating slot 23 of much less depth and somewhat reduced width extends from the rear end of the slot 22 to the adjacent end 16 of the cradle, and a third slot 24 extends from the other end of the first slot 22 forwardly along the top of the cradle. As illustrated, the slot 24 terminates short of the forward end 15 of the cradle and a lateral cut-out 25 is provided at such end substantially to the depth of this slot. Furthermore, the recess area of the cradle adjacent the junction of the slots 22 and 24, to the rear and for some distance in advance of the same, is enlarged by side cut-outs 26 and 27 to the approximate depth of the slot 24.

A cylindrical holder 28 made of suitable insulation material, such as micarta, is mounted in the cradle slot 22 and is of such size or diameter as to project partially from the same or somewhat above the top of the cradle. As shown more fully in FIG. 4, this holder has a plug 29 at one end in which a tapped hole 30 is provided, while the other end is closed by a plug 31 in which there is an orifice 32. Within this holder there is a cylindrical permeable magnetic member or core 33 of reduced size, so that the core does not completely fill the void within the holder. Such core may, for example, be a ferrite rod.

A separate liquid coolant line 34 is brought along the previously mentioned pipe length 17 and connected to the core holder 28 by means of a fitting 35 threaded in the tapped end plug 29 of the same, with the length of this coolant line adjacent the holder accommodated in the cradle slot 23. This line will of course be connected to a remote supply of coolant under pressure.

The core coolant tube 34 can be secured by any suitable expedient, such as taping, to the main coolant pipe 17 for the scarfing tool 10, and it will be seen that the liquid thus supplied to the holder 28 flows around the core piece 33 and is immediately discharged through the end orifice 32 into the substantially flat and relatively enlarged open area at the adjacent top of the cradle 14. The coolant flow to the core is thereby entirely separate from the flow of coolant to the scarfing tool.

The cradle 14 will be relatively positioned in the apparatus in such manner as to locate the magnetic core member 33, in the illustrative welder embodiment, within that section of the tube blank embraced by the induction coil. Such arrangement is shown generally in FIG. 1, in which the core is shown at a greater spacing from the tube blank than would probably be used, the structure being more easily illustrated and understood with the increased separation. In this type of apparatus, the core is most effective in the upper half of the tube blank area and, as noted earlier, the closer the core to the weld zone, the less core material is needed for satisfactory welding. It will be apparent from the drawing that molten weld splatter thrown to the inside of the blank will impinge on the cradle, but will also be chilled by the discharge of the coolant, usually water, from the core holder in this area. The splatter is thus cooled to solid particles and these are flushed from the cradle by the same coolant discharge at the adjacent side reliefs and also at the forward end of the slot through the outlet.

In order further to minimize adherence of the molten metal to the cradle, the bottoms of slot 24 and the communicating side cut-outs 26 and 27 can be coated with a suitable non-metallic smooth coating, such as Teflon, as indicated at 36 in FIG. 5. The flushed particles of course fall to the bottom of the tube and are carried out therewith.

It will also be apparent that the same cradle can be used for mounting longer cores and comparable holders therefor, with the side relief 25 at the forward end of the slot 24 providing the same flushing action for metal particles falling on the cradle.

Other modes of applying the principle of the invention may be employed, change being made as regards the details described, provided the features stated in any of the following claims or the equivalent of such be employed.

I, therefore, particularly point out and distinctly claim as my invention:

1. In tube welding apparatus wherein heating current is caused to flow along converging edges of a longitudinally advancing tube blank for welding of such edges at the juncture thereof, a core assembly adapted to be located within the advancing tube blank, said core assembly comprising enclosure means, a permeable magnetic member housed in said enclosure means and being of such relatively reduced size as to permit the flow of coolant therearound through the enclosure means, conduit means for supplying coolant under pressure to the enclosure means, the latter being provided with outlet means for substantially immediate discharge of the thus supplied coolant therefrom, internal bead trimming means positioned within the tube at a region beyond the edge welding zone and including a coolant conduit extending rearwardly from the same, and means for mounting said enclosure means on said coolant conduit to the internal bead trimming means without impeding the flow of coolant therethrough.

2. In tube welding apparatus wherein heating current is caused to flow along converging edges of a longitudinally advancing tube blank for welding of such edges at the juncture thereof, a core assembly adapted to be located within the advancing tube blank, said core assembly comprising enclosure means, a permeable magnetic member housed in said enclosure means and being of such relatively reduced size as to permit the flow of coolant therearound through the enclosure means, conduit means for supplying coolant under pressure to the enclosure means, the latter being provided with outlet means for substantially immediate discharge of the thus supplied coolant therefrom, internal bead trimming means positioned within the tube at a region beyond the edge welding zone and including a coolant conduit extending rearwardly from the same, and a mount for the enclosure means supported by the coolant conduit to the internal bead trimming means, with at least a portion of said mount adjacent the enclosure means being provided with a non-metallic surface to which molten metal will not adhere.

3. Apparatus as set forth in claim 2 wherein the enclosure means for the magnetic member is made of non-metallic material.

4. Apparatus as set forth in claim 2 wherein the discharge of coolant from the enclosure means is directed over the adjacent non-metallic surface of the mount to flush the same of metal particles which impinge thereon.

5. Apparatus as set forth in claim 4 wherein the adjacent portion of the mount is enlarged relative to the enclosure means to intercept molten metal particles falling to the inside of the tube blank, with such particles being solidified and flushed away by the coolant discharge from the enclosure means.

6. In apparatus of the character described, a core assembly comprising an enclosure, a permeable magnetic member in spaced relation within said enclosure, a mount for the enclosure having a peripheral recess in which the same is disposed, and a conduit connected to the enclosure for supply of coolant under pressure thereto, the enclosure being provided with an orifice for discharge of the coolant therefrom and the mount being formed to provide an independent passage for fluid therethrough, whereby the mount can be supported by connection in a separate fluid line without interfering with flow through the same.

7. A core assembly for use in tube welders and the like comprising a generally tubular housing, a generally cylindrical permeable magnetic member of smaller dimensions in said housing, a conduit connected to one end of said housing for supply of coolant under pressure thereto, the other end of the housing being provided with an orifice for immediate dischrage of the coolant flowing through the housing and hence around the magnetic member, and a mount for the housing having a relatively extended non-metallic surface adjacent such other end of the housing over which the coolant from the latter is discharged, whereby any molten metal particles impinging on said surface are chilled and flushed therefrom by such coolant discharge.

8. A core assembly for use in tube welders and the like comprising a generally tubular housing, a generally cylindrical permeable magnetic member of smaller dimensions in said housing, a conduit connected to one end of said housing for supply of coolant under pressure thereto, the other end of the housing being provided with an orifice for immediate discharge of the coolant flowing through the housing and hence around the magnetic member, and a mount for the housing having a relatively extended surface adjacent such other end of the housing over which the coolant from the latter is discharged, whereby any molten metal particles impinging on said surface are chilled and flushed therefrom by such coolant discharge, said mounting being provided with an independent passage for fluid flow therethrough to permit the mount to be inserted in and supported by a separate fluid line.

9. In tube welding apparatus including means for longitudinally advancing an open tube blank, closure means for bringing the edges of the advancing blank together at a point of welding, and means for flowing high frequency heating current along the blank edges in advance of said point of welding; a core assembly comprising an enclosure and a permeable magnetic member of relatively reduced size housed therewithin, support means for mounting the core assembly inside the advancing tube blank, and means for supplying coolant under pressure to said enclosure, the thus mounted core assembly being so spaced longitudinally from said closure means as to locate the former in advance of the point of welding, and said enclosure being provided with an outlet for discharge of the coolant therefrom forwardly within the tube blank in the direction of the point of welding, so that weld splatter at the point to the interior of the blank is subjected to such internal discharge of the coolant from the core assembly.

10. Apparatus as set forth in claim 9 wherein the support means has a surface which extends forwardly from adjacent the outlet of the core assembly enclosure beyond the point of welding for flow of the coolant discharged from the core assembly over said surface and interception by the latter of interior splatter at the point of welding.

References Cited in the file of this patent

UNITED STATES PATENTS

| | | |
|---|---|---|
| 2,146,430 | Hazen | Feb. 7, 1939 |
| 2,687,464 | Crawford | Aug. 24, 1954 |
| 2,833,910 | Stanton et al. | May 6, 1958 |